US012726987B2

(12) United States Patent
Gao et al.

(10) Patent No.: US 12,726,987 B2
(45) Date of Patent: Sep. 1, 2026

(54) MULTIPLEXING TRANSMISSION METHOD AND APPARATUS, AND STORAGE MEDIUM

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 382 days.

(21) Appl. No.: 18/553,545

(22) PCT Filed: Mar. 14, 2022

(86) PCT No.: PCT/CN2022/080630
§ 371 (c)(1),
(2) Date: Sep. 29, 2023

(87) PCT Pub. No.: WO2022/206356
PCT Pub. Date: Oct. 6, 2022

(65) Prior Publication Data

US 2024/0179715 A1 May 30, 2024

(30) Foreign Application Priority Data

Apr. 2, 2021 (CN) ......................... 202110362325.4

(51) Int. Cl.
*H04W 72/21* (2023.01)
*H04W 72/0446* (2023.01)
*H04W 72/563* (2023.01)

(52) U.S. Cl.
CPC ....... *H04W 72/21* (2023.01); *H04W 72/0446* (2013.01); *H04W 72/563* (2023.01)

(58) Field of Classification Search
CPC ............. H04W 72/21; H04W 72/0446; H04W 72/563; H04L 5/0094; H04L 5/0053; H04L 5/0078
See application file for complete search history.

(56) References Cited

U.S. PATENT DOCUMENTS 12,256,379 B2 * 3/2025 Taherzadeh Boroujeni ................ H04W 72/02
2013/0242923 A1 * 9/2013 Yang ....................... H04L 5/001 370/329

(Continued)

FOREIGN PATENT DOCUMENTS

CN 111769916 A 10/2020
CN 111835480 A 10/2020

(Continued)

OTHER PUBLICATIONS

Taiwan Patent Office, First Office Action Issued in Application No. 111108183, Jul. 11, 2022, 5 pages.

(Continued)

*Primary Examiner* — Jay P Patel
(74) *Attorney, Agent, or Firm* — KILPATRICK TOWNSEND & STOCKTON LLP

(57) ABSTRACT

The embodiments of the present disclosure provide a multiplexing transmission method and apparatus, and a storage medium. The method includes if multiplexing transmission of uplink control informations (UCIs) on physical uplink control channels (PUCCHs) with different physical layer priority is configured or supported, and the PUCCHs are overlapped with each other in terms of time domain, determining a target time unit, and determining PUCCH resources for UCI transmission in the target time unit as a set of PUCCH resources; and determining, on the basis of the (Continued)

In case that multiplexing transmission of uplink control informations (UCIs) on physical uplink control channels (PUCCHs) with different physical layer priorities is configured or supported and the PUCCHs overlap in time domain, determining a target time unit and determining PUCCH resources for UCI transmission in the target time unit as a set of PUCCH resources — 101

Determining, based on the set of PUCCH resources, PUCCH resource(s) for UCI transmission in the target time unit — 102 set of PUCCH resources, PUCCH resource(s) for UCI transmission in the target time unit.

15 Claims, 5 Drawing Sheets

(56) References Cited

U.S. PATENT DOCUMENTS

| | | | | |
|---|---|---|---|---|
| 2019/0052422 | A1 | 2/2019 | Yin et al. | |
| 2020/0305147 | A1 | 9/2020 | Lee et al. | |
| 2020/0359374 | A1* | 11/2020 | Gao | H04W 72/54 |
| 2022/0086849 | A1* | 3/2022 | Lee | H04W 72/0453 |
| 2022/0124756 | A1* | 4/2022 | Taherzadeh Boroujeni | H04W 80/02 |
| 2022/0158800 | A1* | 5/2022 | Jiao | H04L 5/0053 |
| 2022/0279538 | A1* | 9/2022 | Jung | H04W 72/542 |
| 2022/0287054 | A1 | 9/2022 | Kim et al. | |
| 2022/0295521 | A1* | 9/2022 | Gou | H04L 1/1854 |
| 2023/0036232 | A1* | 2/2023 | Oizumi | H04L 1/1861 |
| 2023/0199749 | A1* | 6/2023 | Gerami | H04W 72/21 370/329 |
| 2023/0299900 | A1* | 9/2023 | Gao | H04L 5/0055 370/330 |
| 2023/0309109 | A1* | 9/2023 | Gao | H04L 5/0055 |
| 2024/0057089 | A1* | 2/2024 | Liu | H04W 72/232 |
| 2024/0306154 | A1* | 9/2024 | Wang | H04L 1/0026 |
| 2024/0322979 | A1* | 9/2024 | Marinier | H04L 1/1861 |
| 2025/0310985 | A1* | 10/2025 | Wong | H04W 72/21 |

FOREIGN PATENT DOCUMENTS

| | | | | |
|---|---|---|---|---|
| CN | 112291035 | A | 1/2021 | |
| CN | 112350810 | A | 2/2021 | |
| TW | 201813429 | A | 4/2018 | |
| WO | WO-2019069464 | A1 * | 4/2019 | H04W 72/12 |
| WO | 2021023186 | A1 | 2/2021 | |
| WO | 2021029738 | A1 | 2/2021 | |

OTHER PUBLICATIONS

Taiwan Patent Office, Second Office Action Issued in Application No. 111108183, Sep. 26, 2023, 5 pages.

ISA State Intellectual Property Office of the People's Republic of China, International Search Report Issued in Application No. PCT/CN2022/080630, Jun. 10, 2022, WIPO, 4 pages.

Ericsson, "UCI Enhancements for NR URLLC",3GPP TSG RAN WG1 Meeting#98, Prague, Czech Republic, Aug. 26-30, 2019, total 8 pages, R1-1908122.

State Intellectual Property Office of the People's Republic of China, Office Action Issued in Application No. 202110362325.4, Apr. 4, 2023, 8 pages.

European Patent Office, Extended European Search Report Issued in Application No. 22778540.9, Apr. 4, 2024, Germany, 9 pages.

Moderator (OPPO), "Summary#1 on Intra-UE Multiplexing/Prioritization for R17", 3GPP TSG RAN WG1 #103-e, e-Meeting, Oct. 26-Nov. 13, 2020, total 44 pages, R1-2009045.

* cited by examiner

MULTIPLEXING TRANSMISSION METHOD AND APPARATUS, AND STORAGE MEDIUM

CROSS-REFERENCE TO RELATED APPLICATION

The present application is a National Stage of International Application No.: PCT/CN2022/080630, filed on Mar. 14, 2022, which claims priority to Chinese patent application No. 2021103623254 filed on Apr. 2, 2021, entitled "Multiplexing Transmission Method and Apparatus, and Storage Medium", which are hereby incorporated by reference in their entireties.

FIELD

The present application relates to the field of communication, and in particular, to a multiplexing method and apparatus, and a storage medium.

BACKGROUND

In a 5th generation new radio access technology (RAT) (5G NR), transmissions of uplink channels with different physical layer priority are supported, but resources for the uplink channels with different physical layer priority for the same terminal may conflict. For example, symbols occupied by uplink channels with different priority overlap on the same carrier. In Rel-16, only channels with high physical layer priority among conflicted channels are transmitted, and channels with low physical layer priority are dropped. In Rel-17, in order to avoid dropping uplink control information (UCI) carried on the channels with low physical layer priority, it can be considered to support multiplexing transmission of UCIs on the same channel for UCI carried on multiple physical uplink control channels (PUCCHs) with different physical layer priority. However, there is no specific multiplexing method yet.

SUMMARY

Embodiments of the present application provide a multiplexing method and apparatus, and a storage medium, which realize multiplexing transmission of uplink control informations (UCIs) in a 5G NR system.

An embodiment of the present application provides a multiplexing method, including:

in case that multiplexing transmission of UCIs on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and determining, based on the set of PUCCH resources, PUCCH resource(s) for UCI transmission in the target time unit.

In an embodiment, the determining, based on the set of PUCCH resources, PUCCH resource(s) for UCI transmission in the target time unit includes:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not include PUCCH resources overlapped in time domain.

In an embodiment, in case that the set of PUCCH resources includes multiple PUCCH resources with the earliest start time, selecting a PUCCH resource with longer duration, from the multiple PUCCH resources with the earliest start time, as the first PUCCH resource; or in case that the set of PUCCH resources includes multiple PUCCH resources with the earliest start time and the same duration, selecting any one PUCCH resource, from the multiple PUCCH resources with the earliest start time and the same duration, as the first PUCCH resource.

In an embodiment, the multiplexing rule includes at least one of a first multiplexing rule, a second multiplexing rule, a third multiplexing rule or a fourth multiplexing rule, where the first multiplexing rule includes: determining a target PUCCH resource for simultaneously carrying the UCI on both the first PUCCH resource and the second PUCCH resource, and performing multiplexing transmission of UCIs on the target PUCCH resource;

the second multiplexing rule includes: transmitting PUCCH on one of the first PUCCH resource and the second PUCCH resource and dropping the PUCCH on another resource of the first PUCCH resource and the second PUCCH resource;

the third multiplexing rule includes: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources; and the fourth multiplexing rule includes: in case that there are multiple second PUCCH resources, and the multiple second PUCCH resources include a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs on each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, where the first target multiplexing rule includes any one of the first multiplexing rule, the second multiplexing rule or the third multiplexing rule, and the second target multiplexing rule includes any one of the first multiplexing rule, the second multiplexing rule or the third multiplexing rule.

In an embodiment, in case of any one of the following scenarios, the first multiplexing rule is adopted:

the first PUCCH resource and the second PUCCH resource have the same physical layer priority;

the first PUCCH resource and the second PUCCH resource have different physical layer priority and multiplexing transmission is supported for UCI carried on the first PUCCH resource and the second PUCCH resource; or there are multiple second PUCCH resources, the multiple second PUCCH resources have the same or different physical layer priority as the first PUCCH resource and multiplexing transmission is supported for UCI carried on the first PUCCH resource and the second PUCCH resource.

In an embodiment, the transmitting PUCCH on one of the first PUCCH resource and the second PUCCH resource and dropping the PUCCH on another resource of the first PUCCH resource and the second PUCCH resource, includes:

in case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource; or in case that a specific PUCCH format is used for the first PUCCH resource and the second PUCCH resource, transmitting PUCCH on one of the first PUCCH resource and the second PUCCH resource and dropping the PUCCH on another resource of the first PUCCH resource and the second PUCCH resource.

In an embodiment, the target time unit is a slot; or, the target time unit is the longest transmission unit among transmission units corresponding to PUCCHs with two different physical layer priority, and the transmission unit is a slot or a sub-slot.

In an embodiment, the at least one of the following PUCCH resources is excluded from the set of PUCCH resources:

in case that there is a third PUCCH resource carrying a scheduling request (SR), there is no positive SR in the third PUCCH resource and the third PUCCH resource does not overlap with other PUCCH resources in time domain, then the third PUCCH resource is excluded from the set of PUCCH resources;

in case that multiplexing of HARQ-ACK and channel state information (CSI) is not configured to support, then a PUCCH resource among fourth PUCCH resources carrying the CSI in the target time unit and overlapping with a PUCCH resource carrying HARQ-ACK in time domain is excluded from the set of PUCCH resources; or, in case that multiplexing of HARQ-ACK and CSI is not configured to support, a fifth PUCCH resource carrying HARQ-ACK exists in the target time unit and a long PUCCH format is configured for the fifth PUCCH resource, then a sixth PUCCH resource carrying CSI and using the long PUCCH format in the target time unit is excluded from the set of PUCCH resources.

An embodiment of the present application provides a multiplexing apparatus, including:

a processor;

a memory for storing computer programs; and a transceiver for transmitting and receiving data under the control of the processor; and the computer programs, when executed by the processor, causes the UE to perform the steps of the multiplexing method described above.

An embodiment of the present application provides a multiplexing apparatus, including:

a first determining device, used for, in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and a second determining device, used for determining, based on the set of PUCCH resources, PUCCH resource(s) for UCI transmission in the target time unit.

An embodiment of the present application provides a non-transitory computer readable storage medium having stored thereon a computer program that cause a processor to perform multiplexing method described above.

By the multiplexing method and apparatus, and a storage medium according to the embodiments of the present application, in case that a terminal configures or supports multiplexing transmission of UCIs on PUCCHs with different physical layer priority and the PUCCHs overlap in time domain, a target time unit is determined and PUCCH resources for UCI transmission in the target time unit is determined as a set of PUCCH resources; and then PUCCH resource(s) for UCI transmission in the target time unit is determined based on the set of PUCCH resources, which achieves multiplexing transmission of UCIs without grouping PUCCHs based on the physical layer priority and the performance of the UCI transmission is guaranteed.

BRIEF DESCRIPTION OF THE DRAWINGS

In order to illustrate the solutions disclosed in the embodiments of the present application, the drawings used in the descriptions of the embodiments are briefly described below. The drawings in the following description are only some embodiments of the present application.

DETAILED DESCRIPTION

Figure 1:
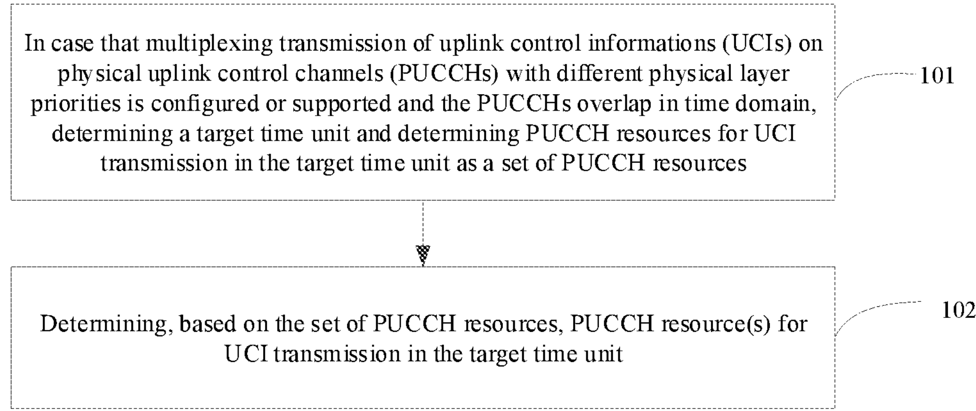
FIG. 1 is a schematic flowchart showing steps of a multiplexing method according to an embodiment of the present application.

In the embodiments of the present application, the term "and/or" describes a related relationship of associated objects, and indicates that there may be three kinds of relationships. For example, A and/or B may represent that A exists alone, A and B exist simultaneously, and B exists alone. Character "/" generally indicates that the associated objects have an "or" relationship.

In the embodiments of the present application, the term "multiple" refers to two or more than two, and other quantifiers are similar.

Furthermore, it should be noted that "one embodiment" or "an embodiment" throughout the specification means that a particular feature, structure, or characteristic associated with the embodiment is included in at least one embodiment of the present application. Thus, "in one embodiment" or "in an embodiment" throughout this specification does not necessarily refer to the same embodiment. Furthermore, the particular features, structures or characteristics may be combined in any suitable manner in one or more embodiments.

In various embodiments of the present application, it should be noted that the size of the sequence numbers of the following processes does not imply the sequence of execution, and the execution sequence of each process should be determined by its functions and internal logic, rather than limiting the implementation of embodiments in the present application.

In the embodiments according to the present application, it should be noted that "B corresponding to A" means associating B with A, and determining B based on A. However, it should also be noted that determining B based on A does not mean determining B based solely on A, and that B may also be determined based on A and/or other information.

The solutions in the embodiments of the present application are clearly and completely described in the following with reference to the accompanying drawings in the embodiments of the present application. These embodiments are only a part of the embodiments of the present application, and not all of the embodiments.

A terminal may support different service types, such as enhanced mobile broadband (eMBB) services and ultra-reliable and low latency communication (URLLC) services. Different service types have different requirements for reliability and transmission latency. URLLC service flows may occur sporadically and irregularly. Therefore, reserving different system resources independently for different services will result in large system resource overhead, and the resources reserved for URLLC may be not used in many cases. In order to improve the utilization rate of system resources, a terminal may support multiplexing of different services on the same resources, where a situation that an earlier scheduled data transmission is interrupted or canceled by another later scheduled data transmission may happen. For example, after a terminal is scheduled to transmit eMBB services on resource 1, due to the arrival of URLLC services, the URLLC services need to be scheduled as soon as possible in order to meet the latency requirements of URLLC services, which may occupy all or part of resources (including time-domain resources and/or frequency-domain resources) in resource 1 that has been allocated to eMBB services. For example, URLLC transmission may be scheduled on all or part of the time-domain resources (symbol sets) scheduled for eMBB services on the same carrier, regardless of whether the frequency domain resources overlap, and then the eMBB services may be interrupted or canceled by the URLLC services since two uplink channels cannot be transmitted on the same carrier simultaneously.

In order to avoid mutual influence between two services, different priority may be defined for different services, and a channel with a high priority is selected for being transmitted and a channel with a low priority is dropped in case that a resource conflict occurs. Therefore, in order to better support the transmissions of different services with different requirements, Rel-16 introduces physical layer priority, and agrees that in case that channels with different physical layer priority conflict, that is, multiple PUCCHs overlap in time domain on the same carrier or a PUCCH and a physical uplink shared channel (PUSCH) overlap in time domain on the same carrier, the channel with a low priority is dropped and the channel with a high priority is transmitted. In case that PUCCHs with the same and different priority overlap with each other, the PUCCHs are divided, based on their priority, into two groups including a group of channels with low priority and a group of channels with high priority. The channels with low priority are multiplexed firstly to obtain PUCCHs with low priority that do not overlap in time domain, the channels with high priority are then multiplexed to obtain PUCCHs with high priority that do not overlap in time domain and then the channels with low priority are canceled or stopped by the channels with high priority. That is, if multiplexed PUCCHs with low priority overlap with PUCCHs with high priority (including multiplexed channels and channels generated during the multiplexing procedure) in time domain, the PUCCHs with low priority are dropped.

The physical layer priority of PUCCH and PUSCH may be obtained through a default mode, dynamical indication through downlink control information (DCI) or semi-static configuration through radio resource control (RRC). For example, when the PUCCH carries a scheduling request (SR), the priority of the PUCCH is determined by a priority corresponding to the SR carried on the PUCCH, and the priority corresponding to each SR is configured by a higher layer signaling. When the PUCCH carries hybrid automatic repeat request-ACKnowledgment (HARQ-ACK) semipersistent scheduling (SPS) PDSCH or HARQ-ACK of PDSCH indicating SPS resource release (SPS PDSCH release), the priority of the PUCCH is determined by an HARQ-ACK codebook index configured for SPS PDSCH by a higher layer signaling, the HARQ-ACK codebook corresponding an index of 0 has low priority, and the HARQ-ACK codebook corresponding an index of 1 has high priority. The PUCCH has a low priority by default when it carries channel state information (CSI), including periodic CSI and SP-CSI. When the DCI includes a priority indication field, the priority of PUCCH and PUSCH may be obtained through the priority indication field in the DCI (or PDCCH, in the present application, PDCCH and DCI may be considered equivalent, DCI is a specific format used for PDCCH transmission, and the corresponding DCI is equivalent to the corresponding PDCCH) corresponding to the PUCCH and PUSCH. For example, the DCI used by the PDCCH includes the priority indication field, then: when the PDCCH schedules a PDSCH, the priority indication field may be used to indicate the priority of the PUCCH carrying the HARQ-ACK of PDSCH. When the PDCCH schedules a PUSCH, the priority indication field may be used to indicate the priority of the scheduled PUSCH, where the PUSCH includes a PUSCH that only carries a transport block (TB) or a PUSCH that only carries aperiodic CSI (A-CSI) or a PUSCH carrying simultaneously TB and A-CSI. For PUSCH carrying SP-CSI, its priority may be obtained through a priority indication field in DCI for activating the PUSCH carrying SP-CSI. When the DCI does not include priority indication field or the priority is not configured by higher layer signaling, the PUCCH has low priority by default.

Uplink control information (UCI) includes HARQ-ACK, CSI, SR and other information. The UCI is transmitted on PUCCH. HARQ-ACK is a general term for ACK and NACK, which is used to feedback PDSCH or PDCCH indicating SPS resource release (also known as SPS PDSCH release), and inform the base station that whether PDSCH or PDCCH indicating SPS PDSCH release is received correctly. CSI is used for feeding back the quality of the downlink channel to help the base station perform better downlink scheduling, such as selecting modulation and coding scheme (MCS), configuring appropriate resource block resources, etc. based on the CSI. SR is used to request, when the terminal has uplink services that need to be transmitted, the base station for the transmission resources of the PUSCH carrying the uplink service.

In the 5G NR system, the PUCCH carrying HARQ-ACK can be transmitted based on slots or sub-slots. The transmission unit of PUCCH is a slot or sub-slot, that is, PUCCH resources (such as the start symbol and the number of symbols) are allocated in one slots or sub-slots. CSI and SR support slot-based transmission. When PUCCH transmissions with two different physical layer priority are supported, the relevant information of PUCCH with each priority is configured independently, including whether the PUCCH is transmitted based on slot or sub-slot. UE can support PUCCHs with two different priority are transmitted respectively in slots or in sub-slots or PUCCHs with one priority are transmitted in slots and PUCCHs with the other priority are transmitted in sub-slots. The sub-slot is obtained by dividing the symbols contained in a slot into multiple groups based on a predetermined method, and each group contains the same or similar number of symbols. For example, a slot contains 14 symbols. The slot can be divided into seven sub-slots with a length of 2 symbols or can also be divided into two sub-slots with a length of seven symbols.

Neither NR R15 nor R16 support parallel transmission of PUCCH and PUSCH at the same time, regardless of whether they are on the same carrier or different carriers. When PUCCH and PUSCH (without explanation, generally PUCCH and PUSCH refer to PUCCH and PUSCH that are not repeated) overlap in time domain resources, and if the predetermined timeline is satisfied, UCI (generally referring to HARQ-ACK and CSI) are transferred from the PUCCH to a PUSCH for being transmitted. When the UCI includes an SR, the SR is not transmitted on the PUSCH, and is then dropped. When there are multiple PUSCHs overlapping with the PUCCH, a PUSCH is selected based on a predetermined rule, the PUSCH carrying A-CSI among the multiple PUSCHs is selected preferably. When there are PUSCHs with PDCCH scheduling (DG PUSCH) and PUSCHs without PDCCH scheduling (CG PUSCH, SP-CSI PUSCH, etc.), DG PUSCH is selected preferably. After selecting based on the above rules, when there are PUSCHs on multiple carriers, the PUSCH on the carrier with the lower carrier index is selected preferably. When multiple PUSCHs which do not overlap in time domain overlap with the PUCCH on the selected carrier, the earliest PUSCH is selected preferably.

The definition of timeline is as follows. When the PUCCH or PUSCH has a corresponding PDCCH, for example, the HARQ-ACK carried by the PUCCH is the HARQ-ACK of the PDSCH with PDCCH scheduling or the HARQ-ACK of the PDCCH indicating downlink SPS resource release, the PDCCH scheduling the PDSCH or the PDCCH indicating the downlink SPS resource release is the PDCCH corresponding to PUCCH, or it can also be called the PDCCH that schedules PUCCH. The PDCCH scheduling PUSCH is the PDCCH corresponding to PUSCH. When there are multiple channels with the same start time, a channel is randomly selected and the first symbol of the randomly selected channel is used as the target symbol. The multiplexing is performed only the target symbol needs to satisfy the following timeline, otherwise it is considered an error scheduling.

Timeline1: The target symbol is not earlier than a first symbol (including CP) after here the T1mux time after the last symbol of any one of PDSCH or SPS PDSCH release that requires HARQ-ACK feedback on PUCCH, that is, a time interval between the target symbol and the last symbol of any one of the above PDSCH or SPS PDSCH release is not less than T1mux time. T1mux is associated with the processing latency of the PDSCH, and can be calculated based on a predetermined formula and related parameters. The purpose of this timeline is to ensure that the acquisition and preparation of the HARQ-ACK can be completed before the transmission of the finally determined channel for transmitting the HARQ-ACK starts.

Timeline2: The target symbol is not earlier than the first symbol after the T2mux time after the last symbol of any PDCCH (including the PDCCH indicating SPS PDSCH release) that schedules PDSCH (if any) and PUSCH (if any) (including the CP), that is, the time interval between the target symbol and the last symbol of any one of the above PDCCHs is not less than T2mux time. T2mux is associated with the processing latency of the PUSCH, and can be calculated based on a predetermined formula and related parameters. The purpose of this timeline is to ensure that in case that UCI needs to be transferred to PUSCH for transmission, the PDCCH scheduling PUSCH can be obtained before PUCCH starts to prepare the UCI transmission, to determine that UCI transmission does not need to be prepared on PUCCH, and the preparation for transmission including UCI can be completed before PUSCH transmission. That is, the acquisition and multiplexing of UCI are completed and the preparation (such as encoding, modulation, scrambling, etc.) of TB is completed. When multiple PUCCHs are multiplexed, this T2mux is used to simulate the preparation time for multiplexing CSI and SR with HARQ-ACK.

In case that the HARQ-ACK carried by the PUCCH has no corresponding PDCCH (that is, the HARQ-ACK is the HARQ-ACK of the SPS PDSCH), there is no PDCCH scheduling the PDSCH at this time. If there is no PUSCH or the PUSCH has no corresponding PDCCH, T1mux only needs to be checked and T2mux does not need to be checked. In case that CSI and/or SR are carried on the PUCCH, since there is no corresponding PDSCH, T1mux does not need to be checked. Further, if there is no PUSCH or the PUSCH has no corresponding PDCCH, T2mux does not need to be checked.

When PUCCH and PUCCH overlap, at least one PUCCH is repeated (that is, occupying multiple slots and repeating UCI in each slot), then only for overlapping repetitions, processing is performed based on transmitting the PUCCH with high priority and dropping the PUCCH with low priority, which does not affect repetitions that do not overlap. If the PUCCH overlaps with the repeated PUSCH, in case that the PUSCH uses slot-based repetition (R15 repetition, or R16 repetition type A), the UCI carried by the PUCCH is transferred to one or more PUSCH slots that overlap with the PUCCH for being transmitted. When PUSCH adopts R16 repetition type B, the UCI carried by PUCCH is transferred to the earliest actual repetition PUSCH overlapping PUCCH and contains more than 1 symbol for being transmitted (actual repetition PUSCH is obtained after segmenting based on unavailable symbols, DL symbols, and slot boundaries); and the one or more repetition PUSCHs overlapping with the PUCCH above all need to meet the multiplexing timeline. When the multi-slot PUCCH overlaps with the single-slot or multi-slot PUSCH, the PUSCH overlapping with the PUCCH is dropped to ensure that repetition of the PUCCH is not interrupted.

When PUCCHs with different physical layer priority overlapping in time domain is supported and the UCI carried can be multiplexed on a PUCCH resource, considering that different PUCCHs may be transmitted based on slots or sub-slots, the following overlapping scenarios and combinations of the following overlapping scenarios may occur:

- overlapping scenario 1: at least one PUCCH with low priority overlaps with two or more time-division multiplexed (TDM-ed) PUCCHs with high priority in time domain;
- overlapping scenario 2: at least one PUCCH with high priority overlaps with two or more TDM-ed PUCCHs with low priority in time domain;
- overlapping scenario 3: at least one PUCCH with low priority or high priority overlaps with at least one TDM-ed PUCCH with low priority and at least one TDM-ed PUCCH with high priority in time domain.

That is, there may be multiple PUCCHs with different physical layer priority in one slot, and they overlap each other. Currently, there is no clear method for how to deal with multiplexing transmission of UCIs in these scenarios.

Therefore, embodiments of the present application provide a multiplexing method and apparatus, and a storage medium, which solve the problem of how to multiplex in the above scenarios.

The methods and the apparatuses are based on the same disclosed concept, the implementation of the devices and the methods can be referred to each other d since the principles of the methods and the apparatuses are similar, and the repetition will not be repeated.

The solutions according to the embodiments of the present application may be applicable to various systems, especially 5G systems. For example, applicable systems may be a global system of mobile communication (GSM) system, a code division multiple access (CDMA) system, a wideband code division multiple access (WCDMA) general packet wireless service (general packet radio service, GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems include a user equipment and a network side device. The system may also include a core network part, such as an evolved packet system (EPS), a 5G system (5GS), and the like.

The terminal in the embodiments of the present application may be a device that provides voice and/or data connectivity to a user, a handheld device with a wireless connection function, or other processing device connected to a wireless modem. In different systems, the names of the terminal may be different. For example, in the 5G system, the terminal may be called as user equipment (UE). A radio terminal can communicate with one or more core networks (CN) via a radio access network (RAN), and the radio terminal can be a mobile terminal, such as a mobile phone (or "cellular" phone) and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A radio terminal may also be called a system, a subscriber unit, a subscriber station, a mobile station, a mobile, a remote station, an access point, a remote terminal, an access terminal, a user terminal, a user agent, and a user device, which are not limited in the embodiments of the present application. Since the terminal and other network device (such as core network device, access network device (i.e. network side device)) together form a network that can support communication, the terminal is also regarded as a network device in the present application.

The network side device involved in the embodiments of the present application may be a base station, and the base station may include cells providing services for the terminal. Depending on the specific application, the network side device may also be called an access point, or may be a device in the access network that communicates with wireless terminal through one or more sectors on the air interface, or other names. Network device can be used to exchange received air frames with Internet Protocol (IP) packets, and act as a router between radio terminal and the rest of the access network, and the rest of the access network can include an Internet protocol (IP) communication network. The network side devices may also coordinate attribute management for the air interface. For example, the network device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a Home evolved Node B (HeNB), a relay node (relay node), a femto, a pico base station (pico), etc., which are not limited in the embodiments of the present application. In some network structures, a network device may include a centralized unit (CU) node and a distributed unit (DU) node, and the centralized unit and the distributed unit may also be geographically separated.

The present application is described below.

FIG. 1 is a schematic flowchart showing steps of a multiplexing method according to an embodiment of the present application and the method includes the following steps:

step 101, in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources.

When the PUCCHs with different physical layer priority overlap in time domain, if multiplexing transmission of UCIs on the PUCCHs with different physical layer priority is configured or supported, the target time unit is determined, and the target time unit is used as a unit, and PUCCH resources for UCI transmission in the target time unit are determined as a set of PUCCH resources.

It should be noted that, all the PUCCH resources in the target time unit are determined as a set of PUCCH resources. As long as there are overlapped resources in this set of PUCCH resources, this needs to be done. It does not mean that the overlapped channels must have different priority. In addition, channels with the same priority may be overlapped since a new channel obtained by multiplexing overlapped channels may overlap with a channel with different priority.

Step 102, determining, based on the set of PUCCH resources, PUCCH resource(s) for UCI transmission in the target time unit.

In this step, the PUCCH resource for UCI transmission in the target time unit may be determined based on the determined set of PUCCH resources, to perform multiplexing transmission of UCIs on the PUCCH resource for UCI transmission.

In the embodiment of the present application, when a terminal configures or supports multiplexing transmission of UCIs on PUCCHs with different physical layer priority and the PUCCHs overlap in time domain, a target time unit is determined and PUCCH resources for UCI transmission in the target time unit is determined as a set of PUCCH resources; and then PUCCH resource(s) for UCI transmission in the target time unit are determined based on the set of PUCCH resources, which achieves multiplexing transmission of UCIs without grouping PUCCHs based on the physical layer priority and ensured the performance of UCI transmission.

In an embodiment, the target time unit is a slot; or, the target time unit is the longest transmission unit among transmission units corresponding to PUCCHs with two different physical layer priority, and the transmission unit is a slot or a sub-slot.

For example, in case that there are one sub-slot with a length of 2 symbols and two sub-slots with a length of 7 symbols, for the sub-slot with the length of 2 symbols overlapping with the both two sub-slots with the length of 7 symbols, the PUCCH in the sub-slot with the length of 2 symbols is allocated to the sub-slots with the length of 7 symbols overlapping with the sub-slot with the length of 2 time domain symbols; and if the two sub-slots with the length of 7 symbols both satisfy a condition or do not satisfy the condition (for example, they have no overlapping PUCCH), the PUCCH in the sub-slot with the length of 2 symbols needs to be allocated to the sets in the two sub-slots with the length of 7. When the PUCCH has been processed (for example, this PUCCH participates in multiplexing with other PUCCHs) in the set in the first sub-slot with the length of 7, this PUCCH does not need to be processed in the second sub-slot with the length of 7, that is, this PUCCH can be dropped from the set to be processed.

In an embodiment, it should be noted that at least one of the following resources is excluded from the set of PUCCH resources.

(1) When there is a third PUCCH resource carrying a scheduling request (SR), there is no positive SR in the third PUCCH resource and the third PUCCH resource does not overlap with other PUCCH resources in time domain, the third PUCCH resource is excluded from the set of PUCCH resources.

Other PUCCH resources include original PUCCH resources and PUCCH resources determined during the multiplexing transmission of UCIs procedure.

(2) When multiplexing of HARQ-ACK and channel state information (CSI) is not configured to support, then a PUCCH resource among fourth PUCCH resources carrying the CSI in the target time unit and overlapping with a PUCCH carrying HARQ-ACK in time domain is excluded from the set of PUCCH resources.

(3) When multiplexing of HARQ-ACK and CSI is not configured to support, and the target time unit includes a fifth PUCCH resource carrying HARQ-ACK and a long PUCCH format is configured for the fifth PUCCH resource, then a sixth PUCCH resource carrying CSI and using the long PUCCH format in the target time unit is excluded from the set of PUCCH resources.

It should be noted that the above-mentioned operations of determining that the set does not include PUCCH resources carrying CSI based on whether to support multiplexing of HARQ-ACK and CSI may be performed on the PUCCH with low physical layer priority or the PUCCH with high priority in the target time unit, or these operations are performed separately on the PUCCH with low physical layer priority and the PUCCH with high physical layer priority in the target time unit, which is not specifically limited here.

In addition, in the embodiment, the determining, based on the set of PUCCH resources, PUCCH resource(s) for UCI transmission in the target time unit may include the following steps.

Step 1, selecting, from the set of PUCCH resources, PUCCH resource with the earliest start time as a first PUCCH resource, and determining, from the set of PUCCH resources, a second PUCCH resource overlapping with the first PUCCH resource in time domain.

In an embodiment, in case that the set of PUCCH resources includes multiple PUCCH resources with the earliest start time, selecting a PUCCH resource with longer duration, from the multiple PUCCH resources with the earliest start time, as the first PUCCH resource; or in case that the set of PUCCH resources includes multiple PUCCH resources with the earliest start time and the same duration, selecting any one PUCCH resource, from the multiple PUCCH resources with the earliest start time and the same duration, as the first PUCCH resource.

It should be noted that the duration may be the number of time domain symbols or the occupation time of the PUCCH resource.

Within the set of PUCCH resources, the priority is not distinguished, and the iteration starts from the channel with the earliest time, instead of the internal multiplexing of grouping priority in the current protocol (such as R16); and then (one or more without distinguishing priority) second target PUCCH resources overlapping with the first target PUCCH resource in time domain are determined from the set of PUCCH resources. If there is no second target PUCCH resource overlapping with the first target PUCCH resource, the above operations are repeated from the next channel resource until the first target PUCCH resource corresponding to the second target PUCCH resource is found. In order to facilitate the selection of the first PUCCH resource, in the step 1, before the first PUCCH resource is selected, the PUCCH resources in the set of PUCCH resources may be sorted based on an ascending order of the start positions of the PUCCH resources, the PUCCH resources with the earlier start position is sorted in the front, and the PUCCH resources with the later start position is sorted behind. If the start positions of the PUCCH resources are the same, the PUCCH resources with the larger symbol length are listed in the front. If the start position and the symbol length of the PUCCH resources are the same, then the PUCCH resources may be sorted randomly. When the first PUCCH resource is determined in step 1, the first PUCCH resource may be taken in order from the set of PUCCH resources, that is, it may be used as the first PUCCH resource.

Step 2, multiplexing, based on a predetermined multiplexing rule, UCI on both the first PUCCH resource and the second PUCCH resource.

The multiplexing includes multiplexing based on the predefined multiplexing transmission of UCIs rules between PUCCHs with the same and/or different priority (multiplexing includes transmitting UCI from multiple overlapping PUCCHs on the same PUCCH, also includes dropping part of PUCCH or dropping part of UCI on part of PUCCH). The basic rule includes: multiplexing PUCCHs with different priority based on the predefined multiplexing rules. If multiplexing is not supported in the definition, PUCCHs with low priority are dropped and PUCCHs with the same priority are multiplexed based on the multiplexing rules defined in the R-15 protocol.

In the present embodiment, the multiplexing rule includes at least one of a first multiplexing rule, a second multiplexing rule, a third multiplexing rule or a fourth multiplexing rule:

- the first multiplexing rule includes: determining a target PUCCH resource for simultaneously carrying the UCI on both the first PUCCH resource and the second PUCCH resource, and performing multiplexing transmission of UCIs on the target PUCCH resource.

In an embodiment, in case of any one of the following scenarios, the first multiplexing rule is adopted:

- the first PUCCH resource and the second PUCCH resource have the same physical layer priority;
- the first PUCCH resource and the second PUCCH resource have different physical layer priority and multiplexing transmission is supported for UCI carried on the first PUCCH resource and the second PUCCH resource; or,
- there are multiple second PUCCH resources, the multiple second PUCCH resources have the same or different physical layer priority as the first PUCCH resource and multiplexing transmission is supported for UCI carried on the first PUCCH resource and the second PUCCH resource.

It should be noted that the physical layer priority corresponding to the PUCCH resources is the physical layer priority corresponding to the PUCCH transmitted on the PUCCH resource or the UCI carried on the PUCCH resource.

The second multiplexing rule includes: transmitting PUCCH on one of the first PUCCH resource and the second PUCCH resource and dropping the PUCCH on another resource of the first PUCCH resource and the second PUCCH resource.

In an embodiment, the transmitting PUCCH on one of the first PUCCH resource and the second PUCCH resource and dropping the PUCCH on another resource of the first PUCCH resource and the second PUCCH resource, includes any one of the following modes.

(1) In case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource.

For example, the first PUCCH resource and the second PUCCH resource have different physical layer priority and multiplexing transmission is not supported for UCI carried on the first PUCCH resource and the second PUCCH resource.

(2) In case that a specific PUCCH format is used for the first PUCCH resource and the second PUCCH resource, transmitting PUCCH on one of the first PUCCH resource and the second PUCCH resource and dropping the PUCCH on another resource of the first PUCCH resource and the second PUCCH resource.

For example, both the first PUCCH resource and the second PUCCH resource are configured with PUCCH format 1, and carry HARQ-ACK and positive SR respectively (it may be that the first PUCCH resource carries HARQ-ACK, and the second PUCCH resource carries positive SR, or vice versa), it is agreed that the PUCCH carrying positive SR is dropped, and only the PUCCH carrying HARQ-ACK is transmitted (regardless of the first PUCCH resource and the second PUCCH resource have the same or different priority).

The third multiplexing rule includes: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources.

In case that there are multiple second PUCCH resources, a first multiplexing rule is performed on the first PUCCH resource and a part of PUCCHs in the multiple second PUCCH resources, and a second multiplexing rule is performed on the first PUCCH resource and a remaining part of PUCCHs in the multiple second PUCCH resources. For example, the second multiplexing rule is performed first, and the first multiplexing rule is performed on the remaining overlapping channel resources, and if the remaining channel resources do not overlap, this step ends.

For example, if CSI with low physical layer priority (LP) and HARQ-ACK with an LP (LP AN) overlaps with high physical layer priority (HP) AN, LP CSI is then dropped and LP+HP AN are performed to avoid that in case that LP AN is multiplexed, the LP AN is transferred to the LP CSI, or an LP AN resource is re-determined to carry the LP AN and LP CSI, but this resource may still be unable to transmit the LP CSI due to overlapping with the HP AN.

The fourth multiplexing rule includes: in case that there are multiple second PUCCH resources, and the multiple second PUCCH resources include a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs on each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, where the first target multiplexing rule includes any one of the first multiplexing rule, the second multiplexing rule or the third multiplexing rule, and the second target multiplexing rule includes any one of the first multiplexing rule, the second multiplexing rule or the third multiplexing rule.

It should be noted that the physical layer priority corresponding to the PUCCH resources is the physical layer priority corresponding to the PUCCH transmitted on the PUCCH resource or the UCI carried on the PUCCH resource. In addition, the first target multiplexing rule and the second target multiplexing rule may be the same or different, which is not specifically limited here.

Step 3, adding a PUCCH resource determined for multiplexing the UCI to the set of PUCCH resources, and deleting the first PUCCH resource and the second PUCCH resource from the set of PUCCH resources to obtain an updated set of PUCCH resources.

In an embodiment, a PUCCH resource determined for multiplexing the UCI based on the multiplexing rule in the step 2 above as a new PUCCH resource is added to the set of PUCCH resources, and the first PUCCH resource and the second PUCCH resource participating the step 2 are deleted from the set of PUCCH resources to obtain an updated set of PUCCH resources.

Step 4, performing repeatedly the step 1 to the step 3 on the updated set of PUCCH resources until the set of PUCCH resources in the target time unit does not include PUCCH resources overlapped in time domain.

In the embodiment, the iterative multiplexing process is performed by iterating the above steps to provide, in case that there are mixed PUCCHs with the same and different priority, a reasonable multiplexing transmission of UCIs rule under the premise of avoiding dropping UCI with low priority as much as possible and the performance of the UCI transmission is ensured.

It should be noted here that the embodiment is applicable to both the terminal side and the network side. If it is applied to the terminal side, the terminal transmits UCI on the PUCCH resource used for transmitting UCI. If it is applied to the network side, the network side receives UCI on the PUCCH resource used for transmitting UCI.

The present application is described below through specific embodiments.

Embodiment 1

Figure 2:
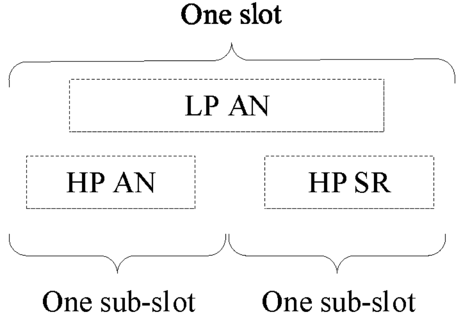
FIG. 2 is a first schematic diagram according to a first embodiment of the present application.
Figure 3:
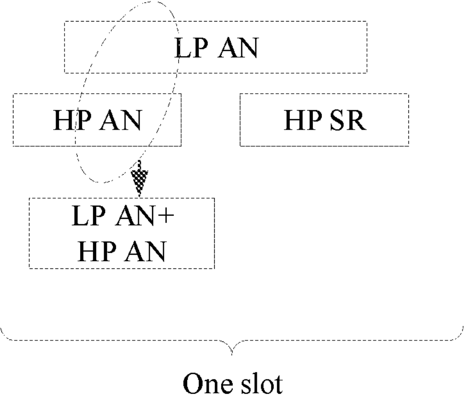
FIG. 3 is a second schematic diagram according to the first embodiment of the present application.
Figure 4:
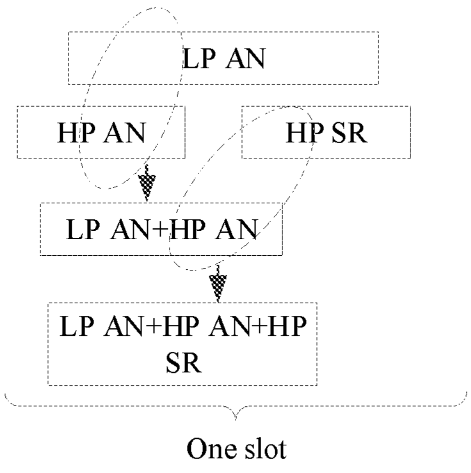
FIG. 4 is a third schematic diagram according to the first embodiment of the present application.

FIG. 2 is a first schematic diagram according to a first embodiment of the present application; FIG. 3 is a second schematic diagram according to the first embodiment of the present application; and FIG. 4 is a third schematic diagram according to the first embodiment of the present application.

FIG. 2 shows PUCCH overlapping situation in a slot, where LP represents low priority, HP represents high priority, and AN is the abbreviation of HARQ-ACK; a slot is determined as a target time unit, three PUCCH resources in the slot are regarded as a set of PUCCH resources.

Firstly, among the set of PUCCH resources, the first earliest channel, that is, the PUCCH carrying HP AN, is taken as the first target channel, and the channel overlapping with the first target channel, that is, the PUCCH carrying LP AN, is determined as the second target channel.

Then, the first target channel and the second target channel are multiplexed based on the predefined multiplexing rule, for example, in case that multiplexing of HP AN and LP AN on the same PUCCH is supported, the multiplexing scheme can be determined based on the PUCCH format used by HP AN and LP AN. The following conditions can be taken as examples.

(1) In case that value of each of LP AN and HP AN is 1 bit:

if PUCCH format 0 is configured for the HP AN, 1-bit HP AN and 1-bit LP AN can be concatenated together to obtain 2-bit AN information, and the 2-bit AN information can be transmitted based on a transmission structure of PUCCH format 0 (specifically, in the related art, that is, based on the state of 2-bit AN information, the cyclic shift corresponding to the 2-bit AN state is selected on the PUCCH resource corresponding to the HP AN. There are 4 cyclic shifts, and different cyclic shifts correspond to different combined states of 2-bit AN. For example, all ACKs correspond to cyclic shift 1, all NACKs correspond to cyclic shift 2, HP and LP have one ACK and one NACK respectively, which can correspond to cyclic shifts 3 and 4, etc. The selected cyclic shift is used to generate a sequence with a length of 12 and is transmitted at the time domain location and frequency domain location corresponding to the PUCCH carrying the HP AN);

if PUCCH format 1 is configured for the HP AN, 1-bit HP AN and 1-bit LP AN can be concatenated together to obtain 2-bit AN information, QPSK modulation is performed on the 2-bit AN information to obtain one modulated symbol, the one modulated symbol is transmitted based on the transmission structure of PUCCH format 1 (specifically, in the related art, for example, the modulated symbol is carried on a cyclically shifted sequence, and orthogonal spread spectrum can be further performed in time domain.)

(2) When a value of at least one of LP AN and HP AN exceeds 1 bit and HP AN has a corresponding DCI, one set of PUCCH resources that can carry the total number of bits of the LP AN and HP AN from multiple set of PUCCH resources pre-configured for HP AN based on the total number of bits and one PUCCH resource is determined from the determined set of PUCCH resources based on the PUCCH resource indication field in the DCI for the HP AN, and the LP An and HP AN are transmitted on the one PUCCH resource simultaneously. The selected PUCCH resource may be the same as or different from the PUCCH resource for the original HP AN.

(3) It should be noted that there may be various other multiplexing rules, as long as the multiplexing transmission of UCIs rules are predefined, all of them can be used in the present application.

Then, a new PUCCH for multiplexing HP AN and LP AN (may be the same as or different from one of the PUCCH resources for the original HP AN and LP AN) is obtained based on the above multiplexing rules and the obtained new PUCCH is added to the PUCCH source set, and HP AN PUCCHs and LP AN PUCCHs that have been multiplexed are deleted from the PUCCH source set to obtain a new PUCCH source set.

Finally, if the new PUCCH resources do not overlap with the HP SR PUCCH resources in the PUCCH source set, the multiplexing process ends, and finally HP and LP AN are transmitted on the new PUCCH resources simultaneously, and HP SR is transmitted on the HP SR PUCCH, as shown in FIG. 3. If the new PUCCH resource overlaps with the HP SR PUCCH resource in the PUCCH source set, then the above process is repeated, that is, the earliest channel, that is, the new PUCCH resource carrying HP and LP AN, in the new set is selected as the first target PUCCH, a PUCCH resource carrying HP SR overlapping the first target PUCCH is used as the second target PUCCH, and the first target and the second target PUCCH are multiplexed based on a predetermined multiplexing rule, for example, the multiplexing of HP SR and LP AN are supported. Because the new PUCCH resource carries both HP AN and LP AN, in case that they are further multiplexed with SR, SR can be converted into information of X=ceil(log 2(K+1)) bits, where K is the number of SRs overlapped with AN, ceil is rounded up. One set of PUCCH resources that can carry the total number of bits of the LP AN, HP AN and SR from multiple set of PUCCH resources pre-configured for HP AN based on the total number of bits and one PUCCH resource is determined from the determined set of PUCCH resources based on the PUCCH resource indication field in the DCI for the HP AN, and the LP AN, HP AN and SR are transmitted on the one PUCCH resource simultaneously. The selected PUCCH resource may be the same as or different from the PUCCH resource for the original HP AN, as shown in FIG. 4.

It should be noted that the exchange location of each PUCCH, or the replacement of UCI HP and LP priority in each PUCCH does not affect performing multiplexing transmission of UCIs on the PUCCH in a slot as a PUCCH set based on the above steps. The difference is that final multiplexing transmission of UCIs results may be different due to different sequences of channels and contents carried on the channels.

Embodiment 2

Figure 5:
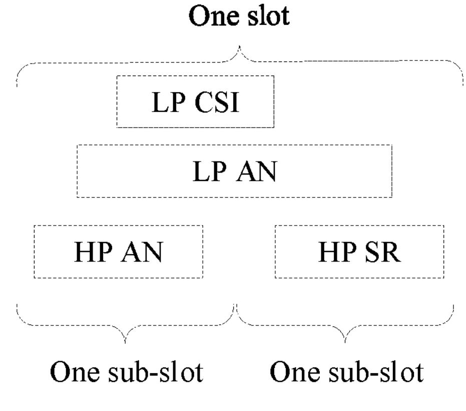
FIG. 5 is a first schematic diagram according to a second embodiment of the present application.
Figure 6:
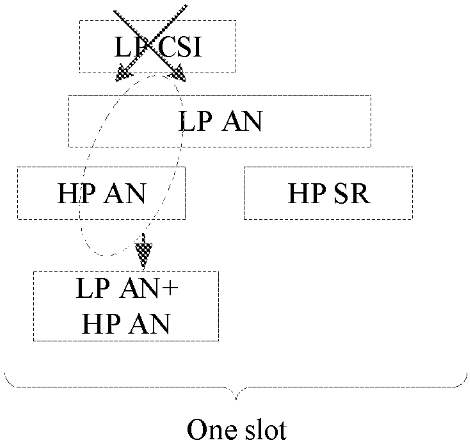
FIG. 6 is a second schematic diagram according to the second embodiment of the present application.
Figure 7:
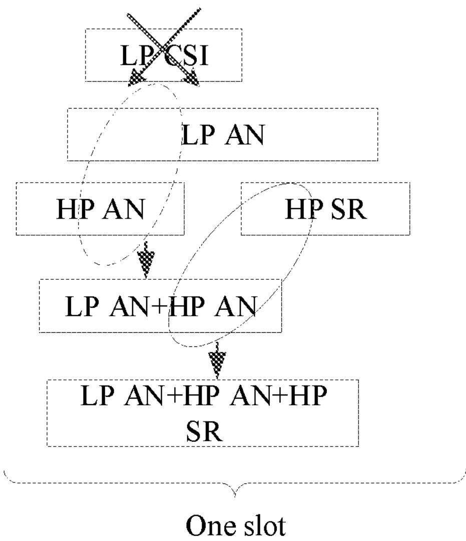
FIG. 7 is a third schematic diagram according to the second embodiment of the present application.
Figure 8:
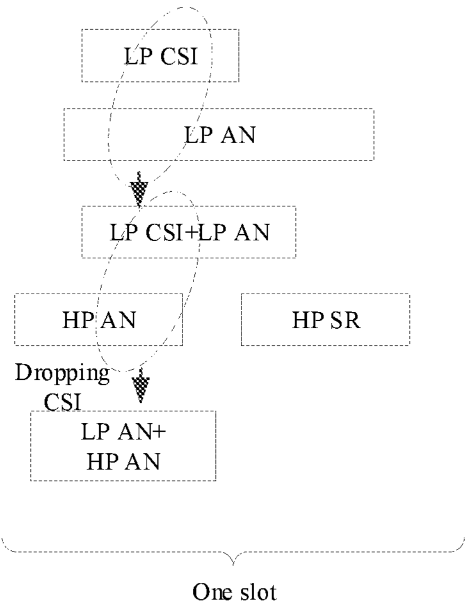
FIG. 8 is a fourth schematic diagram according to the second embodiment of the present application.
Figure 9:
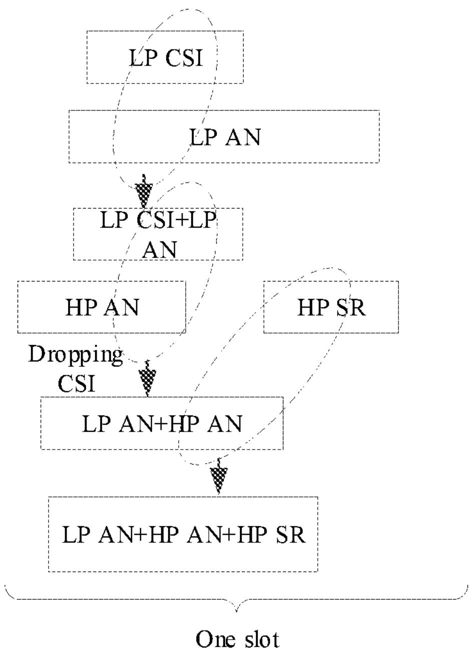
FIG. 9 is a fifth schematic diagram according to the second embodiment of the present application.
Figure 10:
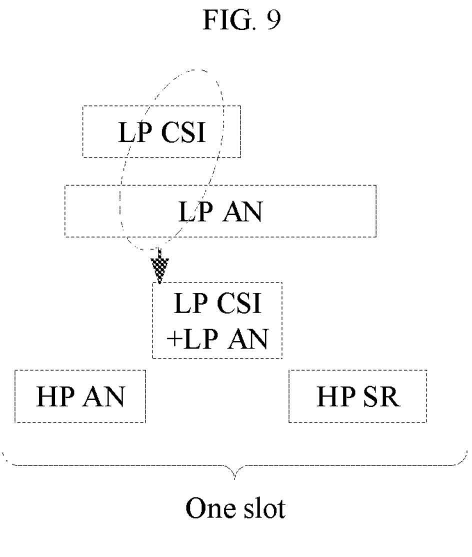
FIG. 10 is a sixth schematic diagram according to the second embodiment of the present application.

FIG. 5 is a first schematic diagram according to a second embodiment of the present application; FIG. 6 is a second schematic diagram according to the second embodiment of the present application; FIG. 7 is a third schematic diagram according to the second embodiment of the present application; FIG. 8 is a fourth schematic diagram according to the second embodiment of the present application; FIG. 9 is a fifth schematic diagram according to the second embodiment of the present application; and FIG. 10 is a sixth schematic diagram according to the second embodiment of the present application.

FIG. 5 shows PUCCH overlapping situation in a slot, where LP represents low priority, HP represents high priority, and AN is the abbreviation of HARQ-ACK; a slot is determined as a target time unit, four PUCCH resources in the slot are regarded as a set of PUCCH resources.

It should be noted that the specific processing method in the embodiment 2 is similar to the embodiment 1, the difference is that in case that the HP AN PUCCH is determined as the first target PUCCH, the second target PUCCHs includes the PUCCHs carrying LP AN and the PUCCHs carrying LP CSI, then the first target PUCCH and the second target PUCCHs can be multiplexed by using the following schemes.

Scheme 1: each PUCCH of the second target PUCCHs and the first target PUCCH are multiplexed, that is, in case that LP CSI and HP AN are multiplexed, it is assumed that if simultaneous transmission of LP CSI and HP AN is not supported based on the predetermined multiplexing rule, LP CSI is dropped and the result of the combination of the two is to drop LP CSI. The method for multiplexing LP AN and HP AN is the same as that of the embodiment 1, and will not be described again. The specific results are shown in FIG. 6 and FIG. 7.

Scheme 2: multiple channels in the first target and the second target PUCCH are firstly grouped based on the priority, the PUCCHs with the same priority are multiplexed firstly. That is, LP CSI and LP AN are grouped together. According to the current multiplexing rules, the following cases can be considered.

Case 1: if the LP AN is the AN of the SPS PDSCH, the LP AN is transferred to the PUCCH resource for the LP CSI and transmitted simultaneously together with the LP CSI. The HP PUCCH does not need to be multiplexed when there is only one PUCCH (when there are multiple HP PUCCHs, they also need to be multiplexed to obtain one HP PUCCH), the LP CSI is multiplexed to obtain an LP PUCCH (here is LP CSI PUCCH, which also carries LP AN), the LP PUCCH and an HP AN are multiplexed to obtain an HP PUCCH (here is HP AN PUCCH) and multiplexing transmission of UCIs is performed. Based on the predetermined multiplexing transmission of UCIs rules, simultaneous transmission of HP AN and LP CSI is not supported, but simultaneous transmission of HP AN and LP AN is supported. The result of multiplexing of LP and HP PUCCH is that the HP AN and LP AN are transmitted simultaneously on a PUCCH (the process is similar to the description in the embodiment 1 and will not be repeated) and the LP CSI is dropped, as shown in FIG. 8 and FIG. 9.

Case 2: if the LP AN is an AN of PDSCH or SPS PDSCH release scheduled by DCI, a PUCCH resource is determined based on the total number of bits of the LP AN and LP CSI (the specific determination method is similar to related content in the embodiment, and will not be repeated, and the PUCCH resource may be the same as or different from the original PUCCH resource for LP AN) for transmitting LP AN and LP CSI simultaneously. That is, the determined PUCCH is used as the PUCCH resource after LP multiplexing. The HP PUCCH does not need to be multiplexed in case that there is only one PUCCH (in case that there are multiple HP PUCCHs, they also need to be multiplexed to obtain one HP PUCCH). Then, it is determined that whether an LP PUCCH obtained after LP multiplexing (the newly determined LP PUCCH here) and the PUCCH for HP AN overlap:

if they do not overlap, the multiplexing process of the first target channel and the second target channel ends, the channels originally participating in the multiplexing are deleted from the set, the new LP PUCCH and HP AN PUCCH as multiplexing results are input into the set, and the updated set is the determined LP PUCCH, HP AN PUCCH, and HP SR PUCCH. The above steps are repeatedly performed on the updated set of PUCCH resources to find the first target PUCCH. If it is assumed that the new LP PUCCH and HP SR PUCCH do not overlap, the whole process ends, and the terminal can transmit the new LP PUCCH, HP AN PUCCH and HP SR PUCCH by TDM, as shown in FIG. 10; and if they overlap, the LP PUCCH and HP PUCCH are multiplexed and the specific process is similar to the case 1, and will not be repeated here.

It should be noted that, in the above-mentioned embodiments, it is always assumed in scheme 1 that the target time unit is a slot for multiplexing processing, and assumed, in scheme 2, that the LP PUCCH uses time-slot-based transmission (that is, the transmission unit is slot), HPPUCCH uses sub-slot (for example, a sub-slot with a length of 7 symbols)-based transmission (that is, the transmission unit is a sub-slot). The longest transmission unit corresponding to the PUCCH with different priority is taken as a target time unit and the target time unit may also be determined as a slot. Other combinations of PUCCH transmission units are not excluded, and the processing method is similar, so details will not be repeated here.

In addition, the embodiment can be applied to the terminal side and the network side, that is, the network side and the terminal side determine the PUCCH resources after the final multiplexing transmission of UCIs based on the same multiplexing transmission of UCIs rules, and receive the multiplexed UCI on the corresponding PUCCH resources.

In addition, in case that the HARQ-ACK with different priority in the above embodiment is replaced by unicast and multicast HARQ-ACK, or replaced by two different UCI transmissions, the embodiments are also applicable.

Figure 11:
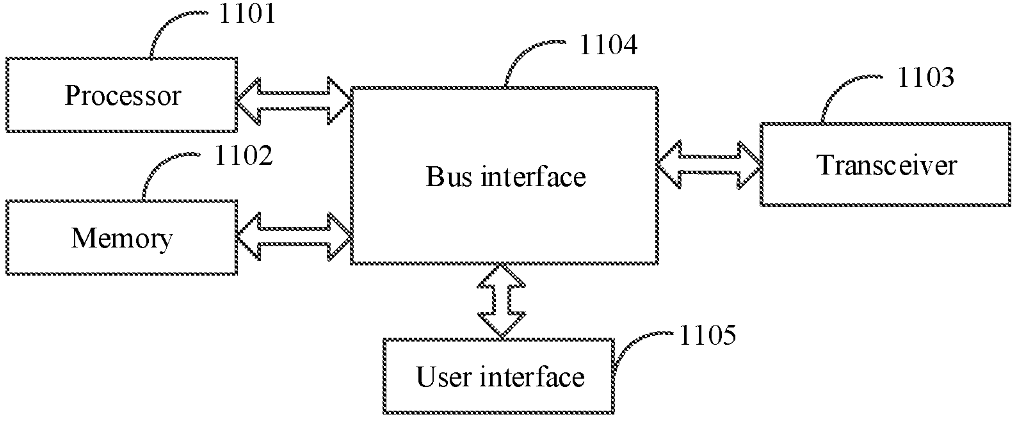
FIG. 11 is a schematic structural diagram of a multiplexing apparatus according to an embodiment of the present application.

FIG. 11 is a schematic structural diagram of a terminal according to an embodiment of the present application. As shown in FIG. 11, the terminal includes a memory 1102, a transceiver 1103, and a processor 1101; wherein, the processor 1101 and the memory 1102 may also be arranged physically separately.

The memory 1102 is used to store computer programs; the transceiver 1103 is used to transmit and receive data under the control of the processor 1101.

In FIG. 11, a bus interface 1104 may include any number of interconnected buses and bridges, which are linked together through various circuits of one or more processors represented by processor 1101 and one or more memories represented by the memory 1102. The bus interface 1104 can also link together various other circuits, such as peripherals, voltage regulators, and power management circuits, which are well known in the art, and therefore will not be further described in the present application. The bus interface provides an interface. Transceiver 1103 may be multiple elements, i.e., including a transmitter and a receiver, units for providing communication with various other devices over transmission media including wireless channels, wired channels, fiber optic cables, and the like. For different user equipment, the user interface 1105 may also be an interface capable of externally or internally connecting the required equipment, and the connected equipment includes, but not limited to, a keypad, a display, a speaker, a microphone, a joystick, and the like.

The processor 1101 is responsible for managing the bus architecture and general processing, and the memory 1102 may store data used by the processor 1101 when performing operations.

In an embodiment, the processor 1101 may be a central processing unit (CPU), an application specific integrated circuit (ASIC), a field-programmable gate array (FPGA), or a complex programmable logic device (CPLD), the processor can also use a multi-core architecture.

The processor 1101 is configured to perform any one of the methods of the embodiments of the present application when executing the executable instructions by calling the computer program stored in the memory 1102. The method includes:

in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and determining, based on the set of PUCCH resources, PUCCH resource(s) for UCI transmission in the target time unit.

In an embodiment, the determining, based on the set of PUCCH resources, PUCCH resource(s) for UCI transmission in the target time unit includes:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not include PUCCH resources overlapped in time domain.

In an embodiment, in case that the set of PUCCH resources includes multiple PUCCH resources with the earliest start time, selecting a PUCCH resource with longer duration, from the multiple PUCCH resources with the earliest start time, as the first PUCCH resource; or in case that the set of PUCCH resources includes multiple PUCCH resources with the earliest start time and the same duration, selecting any one PUCCH resource, from the multiple PUCCH resources with the earliest start time and the same duration, as the first PUCCH resource.

In an embodiment, the multiplexing rule includes at least one of a first multiplexing rule, a second multiplexing rule, a third multiplexing rule or a fourth multiplexing rule, where the first multiplexing rule includes: determining a target PUCCH resource for simultaneously carrying the UCI on both the first PUCCH resource and the second PUCCH resource, and performing multiplexing transmission of UCIs on the target PUCCH resource;

the second multiplexing rule includes: transmitting PUCCH on one of the first PUCCH resource and the second PUCCH resource and dropping the PUCCH on another resource of the first PUCCH resource and the second PUCCH resource;

the third multiplexing rule includes: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources; and the fourth multiplexing rule includes: in case that there are multiple second PUCCH resources, and the multiple second PUCCH resources include a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs on each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, where the first target multiplexing rule includes any one of the first multiplexing rule, the second multiplexing rule or the third multiplexing rule, and the second target multiplexing rule includes any one of the first multiplexing rule, the second multiplexing rule or the third multiplexing rule.

In an embodiment, in case of any one of the following scenarios, the first multiplexing rule is adopted:

the first PUCCH resource and the second PUCCH resource have the same physical layer priority;

the first PUCCH resource and the second PUCCH resource have different physical layer priority and multiplexing transmission is supported for UCI carried on the first PUCCH resource and the second PUCCH resource; or, there are multiple second PUCCH resources, the multiple second PUCCH resources have the same or different physical layer priority as the first PUCCH resource and multiplexing transmission is supported for UCI carried on the first PUCCH resource and the second PUCCH resource.

In an embodiment, the transmitting PUCCH on one of the first PUCCH resource and the second PUCCH resource and dropping the PUCCH on another resource of the first PUCCH resource and the second PUCCH resource, includes:

in case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource; or in case that a specific PUCCH format is used for the first PUCCH resource and the second PUCCH resource, transmitting PUCCH on one of the first PUCCH resource and the second PUCCH resource and dropping the PUCCH on another resource of the first PUCCH resource and the second PUCCH resource.

In an embodiment, the target time unit is a slot; or, the target time unit is the longest transmission unit among transmission units corresponding to PUCCHs with two different physical layer priority, and the transmission unit is a slot or a sub-slot.

In an embodiment, the at least one of the following resources is excluded from the set of PUCCH resources:

in case that there is a third PUCCH resource carrying a scheduling request (SR), there is no positive SR in the third PUCCH resource and the third PUCCH resource does not overlap with other PUCCH resources in time domain, then the third PUCCH resource is excluded from the set of PUCCH resources;

in case that multiplexing of HARQ-ACK and channel state information (CSI) is not configured to support, then a PUCCH resource among fourth PUCCH resources carrying the CSI in the target time unit and overlapping with a PUCCH resource carrying HARQ-ACK in time domain is excluded from the set of PUCCH resources; or, in case that multiplexing of HARQ-ACK and CSI is not configured to support, a fifth PUCCH resource carrying HARQ-ACK exists in the target time unit and a long PUCCH format is configured for the fifth PUCCH resource, then a sixth PUCCH resource carrying CSI and using the long PUCCH format in the target time unit is excluded from the set of PUCCH resources.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

Figure 12:
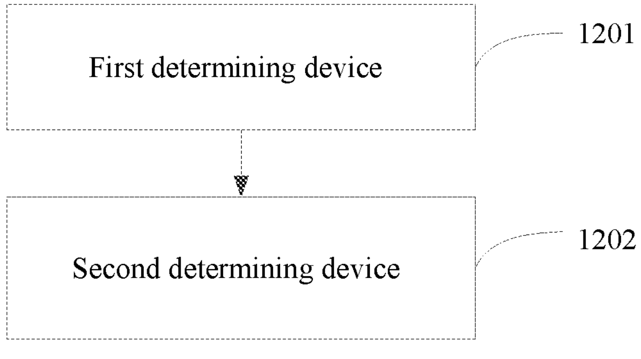
FIG. 12 is a schematic block diagram of a multiplexing apparatus according to an embodiment of the present application.

FIG. 12 is a block diagram showing a panel selection device according to an embodiment of the present application. The device includes:

a first determining device 1201, used for, in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and a second determining device 1202, used for determining, based on the set of PUCCH resources, PUCCH resource(s) for UCI transmission in the target time unit.

In an embodiment, the determining, based on the set of PUCCH resources, PUCCH resource(s) for UCI transmission in the target time unit includes:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not include PUCCH resources overlapped in time domain.

In an embodiment, in case that the set of PUCCH resources includes multiple PUCCH resources with the earliest start time, selecting a PUCCH resource with longer duration, from the multiple PUCCH resources with the earliest start time, as the first PUCCH resource; or in case that the set of PUCCH resources includes multiple PUCCH resources with the earliest start time and the same duration, selecting any one PUCCH resource, from the multiple PUCCH resources with the earliest start time and the same duration, as the first PUCCH resource.

In an embodiment, the multiplexing rule includes at least one of a first multiplexing rule, a second multiplexing rule, a third multiplexing rule or a fourth multiplexing rule, where the first multiplexing rule includes: determining a target PUCCH resource for simultaneously carrying the UCI on both the first PUCCH resource and the second PUCCH resource, and performing multiplexing transmission of UCIs on the target PUCCH resource;

the second multiplexing rule includes: transmitting PUCCH on one of the first PUCCH resource and the second PUCCH resource and dropping the PUCCH on another resource of the first PUCCH resource and the second PUCCH resource;

the third multiplexing rule includes: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources; and the fourth multiplexing rule includes: in case that there are multiple second PUCCH resources, and the multiple second PUCCH resources include a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs on each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, where the first target multiplexing rule includes any one of the first multiplexing rule, the second multiplexing rule or the third multiplexing rule, and the second target multiplexing rule includes any one of the first multiplexing rule, the second multiplexing rule or the third multiplexing rule.

In an embodiment, in case of any one of the following scenarios, the first multiplexing rule is adopted:

the first PUCCH resource and the second PUCCH resource have the same physical layer priority;

the first PUCCH resource and the second PUCCH resource have different physical layer priority and multiplexing transmission is supported for UCI carried on the first PUCCH resource and the second PUCCH resource; or, there are multiple second PUCCH resources, the multiple second PUCCH resources have the same or different physical layer priority as the first PUCCH resource and multiplexing transmission is supported for UCI carried on the first PUCCH resource and the second PUCCH resource.

In an embodiment, the transmitting PUCCH on one of the first PUCCH resource and the second PUCCH resource and dropping the PUCCH on another resource of the first PUCCH resource and the second PUCCH resource, includes:

in case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource; or in case that a specific PUCCH format is used for the first PUCCH resource and the second PUCCH resource, transmitting PUCCH on one of the first PUCCH resource and the second PUCCH resource and dropping the PUCCH on another resource of the first PUCCH resource and the second PUCCH resource.

In an embodiment, the target time unit is a slot; or, the target time unit is the longest transmission unit among transmission units corresponding to PUCCHs with two different physical layer priority, and the transmission unit is a slot or a sub-slot.

In an embodiment, the at least one of the following resources is excluded from the set of PUCCH resources:

in case that there is a third PUCCH resource carrying a scheduling request (SR), there is no positive SR in the third PUCCH resource and the third PUCCH resource does not overlap with other PUCCH resources in time domain, then the third PUCCH resource is excluded from the set of PUCCH resources;

in case that multiplexing of HARQ-ACK and channel state information (CSI) is not configured to support, then a PUCCH resource among fourth PUCCH resources carrying the CSI in the target time unit and overlapping with a PUCCH resource carrying HARQ-ACK in time domain is excluded from the set of PUCCH resources; or in case that multiplexing of HARQ-ACK and CSI is not configured to support, a fifth PUCCH resource carrying HARQ-ACK exists in the target time unit and a long PUCCH format is configured for the fifth PUCCH resource, then a sixth PUCCH resource carrying CSI and using the long PUCCH format in the target time unit is excluded from the set of PUCCH resources.

It should be noted that, the division of units in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit may be implemented in the form of hardware or software functional unit.

If the integrated unit is implemented in the form of a software functional unit and sold or used as an independent product, it may be stored in a computer readable storage medium. Based on such understanding, the embodiments of the present application in essence or a part of the embodiments that contributes to the prior art, or all or part of the embodiments, may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that can store program codes such as U disk, mobile hard disk, read-only memory (ROM), random access memory (RAM), magnetic disk, or optical disk.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

An embodiment of the present application provides a non-transitory computer readable storage medium having stored thereon a computer program that cause a processor to perform the steps of the methods described above, which, for example, includes:

The computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A multiplexing method, comprising:

in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and determining, based on the set of PUCCH resources, PUCCH resource(s) for UCI transmission in the target time unit;

wherein the determining, based on the set of PUCCH resources, PUCCH resource(s) for UCI transmission in the target time unit comprises:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not comprise PUCCH resources overlapped in time domain.

2. The method of claim 1, wherein in case that the set of PUCCH resources comprises multiple PUCCH resources with the earliest start time, selecting a PUCCH resource with longer duration, from the multiple PUCCH resources with the earliest start time, as the first PUCCH resource; or in case that the set of PUCCH resources comprises multiple PUCCH resources with the earliest start time and the same duration, selecting any one PUCCH resource, from the multiple PUCCH resources with the earliest start time and the same duration, as the first PUCCH resource.

3. The method of claim 1, wherein the multiplexing rule comprises at least one of a first multiplexing rule, a second multiplexing rule, a third multiplexing rule or a fourth multiplexing rule, wherein the first multiplexing rule comprises: determining a target PUCCH resource for simultaneously carrying the UCI on both the first PUCCH resource and the second PUCCH resource, and performing multiplexing transmission of UCIs on the target PUCCH resource;

the second multiplexing rule comprises: transmitting PUCCH on one of the first PUCCH resource and the second PUCCH resource and dropping the PUCCH on another resource of the first PUCCH resource and the second PUCCH resource;

the third multiplexing rule comprises: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources; and the fourth multiplexing rule comprises: in case that there are multiple second PUCCH resources, and the multiple second PUCCH resources comprise a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs for each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, wherein the first target multiplexing rule comprises any one of the first multiplexing rule, the second multiplexing rule or the third multiplexing rule, and the second target multiplexing rule comprises any one of the first multiplexing rule, the second multiplexing rule or the third multiplexing rule.

4. The method of claim 3, wherein in case of any one of the following scenarios, the first multiplexing rule is adopted:

the first PUCCH resource and the second PUCCH resource have the same physical layer priority;

the first PUCCH resource and the second PUCCH resource have different physical layer priority and multiplexing transmission is supported for UCI carried on the first PUCCH resource and the second PUCCH resource; or, there are multiple second PUCCH resources, the multiple second PUCCH resources have the same or different physical layer priority as the first PUCCH resource and multiplexing transmission is supported for UCI carried on the first PUCCH resource and the second PUCCH resource.

5. The method of claim 3, wherein the transmitting PUCCH on one of the first PUCCH resource and the second PUCCH resource and dropping the PUCCH on another resource of the first PUCCH resource and the second PUCCH resource comprises:

in case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource; or in case that a specific PUCCH format is used for the first PUCCH resource and the second PUCCH resource, transmitting PUCCH on one of the first PUCCH resource and the second PUCCH resource and dropping the PUCCH on another resource of the first PUCCH resource and the second PUCCH resource.

6. The method of claim 1, wherein the target time unit is a slot; or, the target time unit is the longest transmission unit among transmission units corresponding to PUCCHs with two different physical layer priority, and the transmission unit is a slot or a sub-slot.

7. The method of claim 1, wherein at least one of the following PUCCH resources is excluded from the set of PUCCH resources:

in case that there is a third PUCCH resource carrying a scheduling request (SR), there is no positive SR in the third PUCCH resource and the third PUCCH resource does not overlap with other PUCCH resources in time domain, then the third PUCCH resource is excluded from the set of PUCCH resources;

in case that multiplexing of HARQ-ACK and channel state information (CSI) is not configured to support, then a PUCCH resource among fourth PUCCH resources carrying the CSI in the target time unit and overlapping with a PUCCH resource carrying HARQ-ACK in time domain is excluded from the set of PUCCH resources; or, in case that multiplexing of HARQ-ACK and CSI is not configured to support, a fifth PUCCH resource carrying HARQ-ACK exists in the target time unit and a long PUCCH format is configured for the fifth PUCCH resource, then a sixth PUCCH resource carrying CSI and using the long PUCCH format in the target time unit is excluded from the set of PUCCH resources.

8. A multiplexing apparatus, comprising:

a memory storing a computer program, a processor, a transceiver for transmitting and receiving data under the control the processor, the computer program, when executed by the processor, causes the multiplexing apparatus to perform the following operations of:

in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and determining, based on the set of PUCCH resources, PUCCH resource(s) for UCI transmission in the target time unit;

wherein the determining, based on the set of PUCCH resources, PUCCH resource(s) for UCI transmission in the target time unit comprises:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not comprise PUCCH resources overlapped in time domain.

9. The multiplexing apparatus of claim 8, wherein in case that the set of PUCCH resources comprises multiple PUCCH resources with the earliest start time, selecting a PUCCH resource with longer duration, from the multiple PUCCH resources with the earliest start time, as the first PUCCH resource; or in case that the set of PUCCH resources comprises multiple PUCCH resources with the earliest start time and the same duration, selecting any one PUCCH resource, from the multiple PUCCH resources with the earliest start time and the same duration, as the first PUCCH resource.

10. The multiplexing apparatus of claim 8, wherein the multiplexing rule comprises at least one of a first multiplexing rule, a second multiplexing rule, a third multiplexing rule or a fourth multiplexing rule, wherein the first multiplexing rule comprises: determining a target PUCCH resource for simultaneously carrying the UCI on both the first PUCCH resource and the second PUCCH resource, and performing multiplexing transmission of UCIs on the target PUCCH resource;

the second multiplexing rule comprises: transmitting PUCCH on one of the first PUCCH resource and the second PUCCH resource and dropping the PUCCH on another resource of the first PUCCH resource and the second PUCCH resource;

the third multiplexing rule comprises: in case that there are multiple second PUCCH resources, performing, based on the first multiplexing rule, multiplexing transmission of UCIs for the first PUCCH resource and a part of the multiple second PUCCH resources and performing, based on the second multiplexing rule, multiplexing transmission of UCIs for the first PUCCH resource and a remaining part of the multiple second PUCCH resources; and the fourth multiplexing rule comprises: in case that there are multiple second PUCCH resources, and the multiple second PUCCH resources comprise a second PUCCH resource with the same physical layer priority as the first PUCCH resource and a second PUCCH resource with different physical layer priority as the first PUCCH resource, performing, based on the first multiplexing rule or the second multiplexing rule, multiplexing transmission of UCIs on each of the second PUCCH resources and the first PUCCH resource; or performing, based on a first target multiplexing rule, multiplexing transmission of UCIs for PUCCH resources with the same physical layer priority among the first PUCCH resource and the multiple second PUCCH resources, and then performing, based on a second target multiplexing rule, multiplexing transmission of UCIs for PUCCH resources with different physical layer priority among the first PUCCH resource and the multiple second PUCCH resources, wherein the first target multiplexing rule comprises any one of the first multiplexing rule, the second multiplexing rule or the third multiplexing rule, and the second target multiplexing rule comprises any one of the first multiplexing rule, the second multiplexing rule or the third multiplexing rule.

11. The multiplexing apparatus of claim 10, wherein in case of any one of the following scenarios, the first multiplexing rule is adopted:

the first PUCCH resource and the second PUCCH resource have the same physical layer priority;

the first PUCCH resource and the second PUCCH resource have different physical layer priority and multiplexing transmission is supported for UCI carried on the first PUCCH resource and the second PUCCH resource; or, there are multiple second PUCCH resources, the multiple second PUCCH resources have the same or different physical layer priority as the first PUCCH resource and multiplexing transmission is supported for UCI carried on the first PUCCH resource and the second PUCCH resource.

12. The multiplexing apparatus of claim 10, wherein the transmitting PUCCH on one of the first PUCCH resource and the second PUCCH resource and dropping the PUCCH on another resource of the first PUCCH resource and the second PUCCH resource, comprises:

in case that the first PUCCH resource and the second PUCCH resource have different physical layer priority and multiplexing transmission is not supported for UCI carried on the first PUCCH resource and the second PUCCH resource, transmitting PUCCH only on a PUCCH resource with a higher physical layer priority among the first PUCCH resource and the second PUCCH resource and dropping the PUCCH on a PUCCH resource with a lower physical layer priority among the first PUCCH resource and the second PUCCH resource; or in case that a specific PUCCH format is sued for the first PUCCH resource and the second PUCCH resource, transmitting PUCCH on one of the first PUCCH resource and the second PUCCH resource and dropping the PUCCH on another resource of the first PUCCH resource and the second PUCCH resource.

13. The multiplexing apparatus of claim 8, wherein:

the target time unit is a slot; or, the target time unit is the longest transmission unit among transmission units corresponding to PUCCHs with two different physical layer priority, and the transmission unit is a slot or a sub-slot.

14. The multiplexing apparatus of claim 8, wherein at least one of the following PUCCH resources is excluded from the set of PUCCH resources:

in case that there is a third PUCCH resource carrying a scheduling request (SR), there is no positive SR in the third PUCCH resource and the third PUCCH resource does not overlap with other PUCCH resources in time domain, then the third PUCCH resource is excluded from the set of PUCCH resources;

in case that multiplexing of HARQ-ACK and channel state information (CSI) is not configured to support, then a PUCCH resource among fourth PUCCH resources carrying the CSI in the target time unit and overlapping with a PUCCH resource carrying HARQ-ACK in time domain is excluded from the set of PUCCH resources; or, in case that multiplexing of HARQ-ACK and CSI is not configured to support, a fifth PUCCH resource carrying HARQ-ACK exists in the target time unit and a long PUCCH format is configured for the fifth PUCCH resource, then a sixth PUCCH resource carrying CSI and using the long PUCCH format in the target time unit is excluded from the set of PUCCH resources.

15. A non-transitory computer readable storage medium, storing computer programs, wherein the computer programs, when executed by a processor, cause the processor to perform the following operations:

in case that multiplexing transmission of uplink control informations (UCIs) on physical uplink control channels (PUCCHs) with different physical layer priority is configured or supported and the PUCCHs overlap in time domain, determining a target time unit and determining PUCCH resources for UCI transmission in the target time unit as a set of PUCCH resources; and determining, based on the set of PUCCH resources, PUCCH resource(s) for UCI transmission in the target time unit;

wherein the determining, based on the set of PUCCH resources, PUCCH resource(s) for UCI transmission in the target time unit comprises:

step 1, selecting, from the set of PUCCH resources, PUCCH resource with the earliest start time as a first PUCCH resource, and determining, from the set of PUCCH resources, a second PUCCH resource overlapping with the first PUCCH resource in time domain;

step 2, multiplexing, based on a predetermined multiplexing rule, UCI on both the first PUCCH resource and the second PUCCH resource;

step 3, adding a PUCCH resource determined for multiplexing the UCI to the set of PUCCH resources, and deleting the first PUCCH resource and the second PUCCH resource from the set of PUCCH resources to obtain an updated set of PUCCH resources; and step 4, performing repeatedly the step 1 to the step 3 on the updated set of PUCCH resources until the set of PUCCH resources in the target time unit does not comprise PUCCH resources overlapped in time domain.

* * * * *